United States Patent Office 3,131,174
Patented Apr. 28, 1964

3,131,174
N$^G$ TOSYL ARGININE AND PEPTIDE
SYNTHESIS THEREWITH
Robert Schwyzer, Riehen, Switzerland, assignor to Ciba Corporation, a corporation of Delaware
No Drawing. Filed Aug. 19, 1959, Ser. No. 834,635
Claims priority, application Switzerland Sept. 5, 1958
5 Claims. (Cl. 260—112)

The present invention relates to the temporary protection of the amino groups in arginyl compounds, that is to say of the α-amino group and of the guanidino group of the arginyl radical of the formula

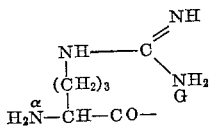

in compounds containing said radical, inter alia in arginine itself or in arginyl-aminocarboxylic acids and derivatives thereof, more especially in peptides.

It is known that the arginyl radical is present in various peptides occurring in nature. The synthesis of peptides containing this aminocarboxylic acid radical is, therefore, of considerable importance. In such syntheses the guanidino group must be protected since it otherwise would undergo undesirable acylations. Hitherto, the nitro group has been used as protecting group; this group can be eliminated by hydrogenation, but this is accompanied by the elimination of a radical that can be split off by hydrogenation, such as the carbobenzoxy group, for protection of the α-amino group. It is thus in this case impossible to achieve the liberation of a protected amino group in the α-position by the handy and mild method of catalytic hydrogenation as this would be accompanied by elimination of the nitro group.

Moreover, the above-mentioned method of protecting the guanidino group by means of the nitro group is unsuitable in cases where the guanidino group cannot be liberated by hydrogenation, for example when the peptide contains a sulfur compound.

As an alternative method of protecting the guanidino group it has been proposed to make use of the carbobenzoxy group which can be eliminated both by hydrogenation and by hydrolysis. This acyl radical is, however, not adapted to prevent further acylation taking place at the guanidino group during the synthesis of the peptide.

The present invention is based on the observation that the amino groups of the arginyl radical can be temporarily protected with advantage by using as protection for the guanidino group an arylsulfonyl group and for the α-amino group a radical capable of elimination by hydrogenation.

The aryl radicals may belong to the monocyclic or dicyclic series, such as the benzene or naphthalene series. Advantageously, they are radicals of the benzenesulfonic or ortho- or para-toluene-sulfonic acid.

Residues capable of elimination by hydrogenation are above all the carbobenzoxy groups, such as the carbobenzoxy group and p-nitro-carbobenzoxy group, or paraphenyl- or para-naphthyl-azobenzyloxy-carbonyl radicals which may be unsubstituted or substituted by lower alkyl, halogen or nitro in the para'-position, such as the orange-colored para - (para'-methoxy-phenylazo) - benzyloxy-carbonyl radical (=MZ—), or the p-phenylazo-benzyl-oxy-carbonyl residue, and also aralkyl residues such as the benzyl residue, the p-nitro-benzyl residue or p-halogen benzyl residues.

The temporary protection given to the guanidino group of the arginyl residue according to the present invention opens up new possibilities in the synthesis of peptides, which do not involve the disadvantages mentioned above.

The protected amino groups can be liberated selectively. By the acylation with the arylsulfonyl group subsequent acylation is prevented. Consequently only N$^G$-monoarylsulfonyl derivatives are obtained.

The arylsulfonyl radical can be eliminated with hydrolyzing agents, for example by treatment with concentrated hydrochloric acid, or by hydrogenolysis, for example with sodium in liquid ammonia, or by other methods known for eliminating the arylsulfonyl group.

In the course of the synthesis the substituent of the α-amino group can be eliminated in the usual manner by hydrogenation. If the group which protects the α-amino group and which can be split off by hydrogenation is an acyl group—such as the carbobenzoxy- or para-(para'-methoxyphenylazo)-benzyloxy-carbonyl group—it can alternatively be eliminated with a mild hydrolyzing agent without the arylsulfonyl radical in the guanidino group being eliminated too.

The introduction of the protective group and its elimination are performed by as such known methods. An advantageous way to acylate the guanidino group is by reaction with an arylsulfonyl halide, for example an arylsulfonyl chloride or bromide, such as benzene- or ortho- or para-toluene-sulfonyl chloride or bromide. The reaction is advantageously conducted in a water-miscible organic solvent in the presence of an alkali, for example in acetone in the presence of sodium hydroxide solution. The reaction gives good yields.

The following examples illustrate the invention.

*Example 1*

3.43 grams of N$^α$-carbobenzoxy-L-arginine are dissolved in 16.5 cc. (6 equivalents) of cold 4 N-sodium hydroxide solution, and 100 cc. of acetone are added to this solution. The solution is treated in an ice bath with 5.31 grams of para-toluenesulfonyl chloride (=tosyl chloride; about 2.5 equivalents) in small portions. After 1 hour the solution is diluted with water, acidified with hydrochloric acid and extracted with ethyl acetate. The ethyl acetate extract is extracted with dilute ammonia, the resulting alkaline solution of N$^α$-carbobenzoxy-N$^G$-tosyl-L-arginine is acidified, again extracted with ethyl acetate, and the extract is evaporated. The residue, which still contains some unreacted N$^α$-carbobenzoxy-arginine, is dissolved in ethanol of 50% strength and percolated through a small ion-exchanger column (Dowex 50, H$^+$ form). On evaporation, the eluates yield pure N$^α$-carbobenzoxy-N$^G$-tosyl-L-arginine in the form of a glassy substance. Yield: 4.1 grams (81% of theory). Optical rotation $[\alpha]_D^{26} = +9.5°$ (in ethanol).

*Example 2*

To eliminate the carbobenzoxy group of N$^α$-carbobenzoxy-N$^G$-tosyl-L-arginine, this compound is subjected to catalytic hydrogenation.

The arginine derivative is treated with hydrogen under atmospheric pressure in a methanolic solution containing 1 equivalent of N-hydrochloric acid and a palladium catalyst.

The hydrochloride is isolated in the usual manner; it is a glassy substance. Yield: 95%.

$R_F$ value=0.36 in paper-chromatography in the system butanol+glacial acetic acid+water (4:1:1). Spot test: ninhydrin positive, Sakaguchi negative.

Paper-electrophoresis at 200 volts and pH about 6.5 [solvent system: 2:4:6-collidin+glacial acetic acid +water (8.9:3.1:8.8)] reveals a single spot which is ninhydrin-positive and Sakaguchi-negative and migrates towards the cathode at the same speed as leucine.

*Example 3*

Alternatively, the selective elimination of the carbobenzoxy group of N$^α$-carbobenzoxy-N$^G$-tosyl-L-arginine can be performed by treatment with a slight excess of 2 N-hydrogen bromide in glacial acetic acid for 1 hour at room temperature.

The hydrobromide is isolated in the known manner and forms a glassy substance. Yield: 85%.

The paper-chromatography and electrophoresis are performed as described in Example 2 and produce identical results.

*Example 4*

6.4 mg. of the hydrochloride of $N^G$-tosyl-L-arginine are stirred for 3 hours with 5 cc. of water, 5 cc. of acetone and 1 gram of magnesium oxide. A solution of 600 mg. of para-(para'-methoxyphenylazo)-benzyloxy-carbonyl chloride (=MZ— chloride) in 5 cc. of acetone is then added, and the mixture is stirred on for 18 hours at room temperature.

$N^\alpha$-MZ-$N^G$-tosyl-L-arginine is isolated as described for the carbobenzoxy derivative in Example 1. Yield: 885 mg. (=97% of theory). It is an orange-colored, microcrystalline substance melting at 260° C. with decomposition. $R_F$ value on acetylated paper in the system butanol +glacial acetic acid+water (4:1:1)=0.61. On Whatman paper No. 1 [bottom phase: carbon tetrachloride +methanol+pyridine+water (4:2:1)], $R_F$ value=0.38.

The identical product is obtained by tosylating $N^\alpha$-[para - (para' - methoxyphenylazo) - benzyloxy-carbonyl]-L-arginine as described in Example 1.

*Example 5*

750 mg. of $N^\alpha$-[para-(para'-methoxyphenylazo)-benzyloxy-carbonyl]-$N^G$-tosyl-arginine in ethyl acetate are mixed with a solution of 440 mg. of L-tryptophyl-glycine methyl ester in ethyl acetate, whereupon the insoluble salt separates out as an oil. The solvent is evaporated in vacuo and the residue dissolved in 80 cc. of acetonitrile. The solution is cooled to 0° C. and treated with 290 mg. of dicyclohexyl carbodiimide. After 24 hours, the dicyclohexyl-urea is filtered off and the filtrate evaporated in vacuo. The residue is dissolved in ethyl acetate and treated with hydrochloric acid and dilute ammonia to yield pure $N^\alpha$-[para-(para'-methoxyphenylazo)-benzyloxy-carbonyl] - $N^G$ - tosyl - arginyl - tryptophyl-glycine methyl ester.

Paper-chromatographic examination on acetylated paper reveals no spots of positive reaction to ninhydrin or according to Sakaguchi but merely an isolated orange-colored spot of the following $R_F$ values:

With butanol+glacial acetic acid+water (4:1:1)=0.701; Carbon tetrachloride + methanol + pyridine + water (4:2:1:1), with the bottom phase=0.256; with the supernatant phase=0.630.

*Example 6*

The para-(para'-methoxyphenylazo)-benzyloxy-carbonyl(=) group of $N^\alpha$-MZ-$N^G$-tosyl-arginyl-tryptophyl-glycine methyl ester (Example 5) is eliminated by catalytic hydrogenation in methanol+glacial acetic acid with a palladium catalyst.

The MZ-group of $N^\alpha$-MZ-$N^G$-tosyl-arginyl-tryptophyl-glycine methyl ester can alternatively be eliminated by treatment with 3 N-hydrogen bromide in glacial acetic acid. The elimination is performed with a slight excess of 3 N-hydrogen bromide in glacial acetic acid for 3 hours.

The resulting tripeptides obtained in either case possess identical properties.

$R_F$ values on Whatman paper No. 1:

With butanol+glacial acetic acid+water (4:1:1)=0.77 (ninhydrin and Ehrlich tests positive);
With butanol + pyridine + glacial acetic acid + water (30:20:6:24)=0.89.

The identical tripeptide ester (H.$N^G$-tosyl-arginyl-tryptophyl-glycine hydroxymethyl) is obtained when $N^\alpha$-[para-(para'-methoxyphenylazo)-benzyloxy-carbonyl]-$N^G$-tosyl-arginine is replaced by $N^\alpha$-carbobenzoxy-$N^G$-tosyl-arginine.

What is claimed is:

1. α-Amino-protected peptides containing an arginyl radical in which the guanidino group is substituted by a p-toluenesulfonyl radical and the α-amino group is substituted by a member selected from the group consisting of a carbobenzoxy group, a p-phenyl-azobenzyloxy-carbonyl group, a p-naphthyl-azobenzyloxy-carbonyl group, a p-(p'-methoxy-phenylazo)carbonyl group, a benzyl group, a p-nitrobenzyl group and a p-halogen benzyl group.
2. $N^\alpha$-carbobenzoxy-$N^G$-tosyl-L-arginine.
3. $N^\alpha$-[p-(p'-methoxy-phenylazo)-benzyloxy-carbonyl]-$N^G$-tosyl-L-arginine.
4. $N^G$-tosyl-L-arginine.
5. $N^G$-tosyl-L-arginine-peptides.

References Cited in the file of this patent

Barrass et al.: Journal Chem. Society (London), Part III, pages 3134–39, July 1957.

Anson: Advances in Protein Chemistry, volume 5, pages 25–32, 1949 (Academic Press Inc., publishers).

Clarke: Benzenesulfonylguanidines, J.A.C.S. 54, 1964–68 (1932).

Schwyzer et al.: Helvetica Chimica Acta, volume 41, fasc. II, pages 491–498, March 15, 1958.

Greenstein et al.: Chemistry of the Amino Acids, volume II, John Wiley and Sons, New York, 1961 (pages 883–901; 1068–1077 of interest).

Schwyzer et al.: Helvetica Chimica Acta, volume 40, fasc. III, pages 624–639, May 2, 1957.

Milne et al.: Journal of the American Chemical Society (1957), vol. 79, pages 639–644.